(12) United States Patent
Treibach-Heck et al.

(10) Patent No.: US 7,500,201 B2
(45) Date of Patent: *Mar. 3, 2009

(54) DATA INPUT METHOD AND SYSTEM WITH MULTI-SUB-FIELD MATCHING OF USER ENTRIES INTO A GRAPHICAL INPUT DEVICE

(75) Inventors: Varda Treibach-Heck, Redwood City, CA (US); Byron G. Caldwell, Los Angeles, CA (US); Bruce Johnson, Chatsworth, CA (US)

(73) Assignee: Call-Tell LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/445,908

(22) Filed: Jun. 2, 2006

(65) Prior Publication Data

US 2006/0224995 A1   Oct. 5, 2006

Related U.S. Application Data

(62) Division of application No. 10/080,472, filed on Feb. 22, 2002, now Pat. No. 7,080,325.

(51) Int. Cl.
*G06F 3/048* (2006.01)
*G06F 3/00* (2006.01)

(52) U.S. Cl. .................. 715/780; 715/224; 715/225; 715/226

(58) Field of Classification Search ............ 715/739, 715/760, 821, 822, 823, 810, 809, 808, 816, 715/224, 225–226; 705/14
See application file for complete search history.

(56) References Cited

U.S. PATENT DOCUMENTS

| | | | | |
|---|---|---|---|---|
| 5,040,113 A | * | 8/1991 | Mickunas | 715/202 |
| 5,544,048 A | * | 8/1996 | Dugan et al. | 715/210 |
| 5,640,577 A | * | 6/1997 | Scharmer | 715/235 |
| 5,666,502 A | * | 9/1997 | Capps | 715/811 |
| 5,724,457 A | * | 3/1998 | Fukushima | 382/311 |
| 5,734,749 A | * | 3/1998 | Yamada et al. | 382/187 |
| 5,896,321 A | * | 4/1999 | Miller et al. | 365/189.15 |
| 5,960,114 A | * | 9/1999 | Dauerer et al. | 382/229 |
| 6,041,323 A | * | 3/2000 | Kubota | 707/5 |
| 6,067,348 A | * | 5/2000 | Hibbeler | 379/88.16 |
| 6,314,439 B1 | * | 11/2001 | Bates et al. | 715/209 |
| 6,377,965 B1 | * | 4/2002 | Hachamovitch et al. | 715/203 |

(Continued)

OTHER PUBLICATIONS

Microsoft Outlook, 1995-1999 Microsoft Corp.*

(Continued)

*Primary Examiner*—Steven B Theriault
(74) *Attorney, Agent, or Firm*—Jeffrey Pearce

(57) ABSTRACT

A current set of user-selectable choices is associated with a displayed graphical input device, which is used to select a value of an input parameter. Each user-selectable choice has at least one pair of information fields separated by a delimiter and each information field comprises sequentially ordered characters. A search for a matching entry to assign to the input parameter is carried out as the user enters each of a sequence of characters, and if a match is not found in a first information field, then (or simultaneously) it is sought in a different information field, also on the basis of the character-by-character user entries.

21 Claims, 3 Drawing Sheets

U.S. PATENT DOCUMENTS

| | | | | |
|---|---|---|---|---|
| 6,453,280 B1 * | 9/2002 | Yang | ............................ | 704/10 |
| 6,567,103 B1 * | 5/2003 | Chaudhry | .................... | 715/738 |
| 6,662,340 B2 * | 12/2003 | Rawat et al. | ................. | 715/236 |
| 6,671,856 B1 * | 12/2003 | Gillam | ........................ | 715/210 |
| 6,741,235 B1 * | 5/2004 | Goren | ......................... | 345/173 |
| 6,744,451 B1 * | 6/2004 | Anderson et al. | ............ | 715/841 |
| 6,768,991 B2 * | 7/2004 | Hearnden | ....................... | 707/5 |
| 6,879,736 B1 * | 4/2005 | Satomi | ........................ | 382/295 |
| 6,928,623 B1 * | 8/2005 | Sibert | ........................ | 715/783 |
| 6,934,767 B1 * | 8/2005 | Jellinek | ........................ | 709/247 |
| 6,964,020 B1 * | 11/2005 | Lundy | ......................... | 715/210 |
| 6,981,028 B1 * | 12/2005 | Rawat et al. | ................. | 709/217 |
| 7,167,901 B1 * | 1/2007 | Beadle et al. | ................ | 709/207 |
| 7,185,271 B2 * | 2/2007 | Lee et al. | ..................... | 715/226 |
| 7,216,292 B1 * | 5/2007 | Snapper et al. | .............. | 715/236 |
| 7,322,023 B2 * | 1/2008 | Shulman et al. | .............. | 717/112 |
| 7,346,652 B2 * | 3/2008 | Berrigan et al. | .............. | 709/203 |
| 7,451,398 B1 * | 11/2008 | Rohrs | ......................... | 715/271 |
| 2002/0105542 A1 * | 8/2002 | Rosar | ......................... | 345/741 |
| 2003/0041147 A1 * | 2/2003 | van den Oord et al. | ....... | 709/227 |
| 2003/0182279 A1 * | 9/2003 | Willows | ........................ | 707/4 |
| 2004/0139070 A1 * | 7/2004 | Dysart et al. | .................... | 707/3 |
| 2005/0131686 A1 * | 6/2005 | Yamamoto et al. | ........... | 704/231 |
| 2005/0240472 A1 * | 10/2005 | Postrel | ......................... | 705/14 |
| 2006/0048074 A1 * | 3/2006 | Klein | .......................... | 715/811 |
| 2006/0059434 A1 * | 3/2006 | Boss et al. | ................... | 715/780 |
| 2006/0168509 A1 * | 7/2006 | Boss et al. | ................... | 715/507 |
| 2008/0010253 A1 * | 1/2008 | Sidhu et al. | .................... | 707/3 |

OTHER PUBLICATIONS

Microsoft Internet Explorer, 1995-2001 Microsoft Corp.*

* cited by examiner

FIG. 2A

CUSTOMER VISIT REPORT — 126

Employee: Beck, Rose — 500
Service Type: — 502, 503
Date: — 504, 230, 505
Customer Name: — 506
Address: — 507
City: — 508
State/Country: — 509, 510
ZIP/ Postal Code: — 511

FIG. 2B

CUSTOMER VISIT REPORT — 126

Employee: Beck, Rose — 500
Service Type: — 502, 503
Date: — 
520 —
- CODE 01:Installation
- CODE 02:Scheduled Maintenance
- CODE 03:Warranty Service
- CODE 04:Non-Warranty Service
- CODE 05:Upgrading
- CODE 06:Field Testing — 230

Customer Name: — 506
Address: — 507
City: — 508
Country: — 509, 510
Code: — 511

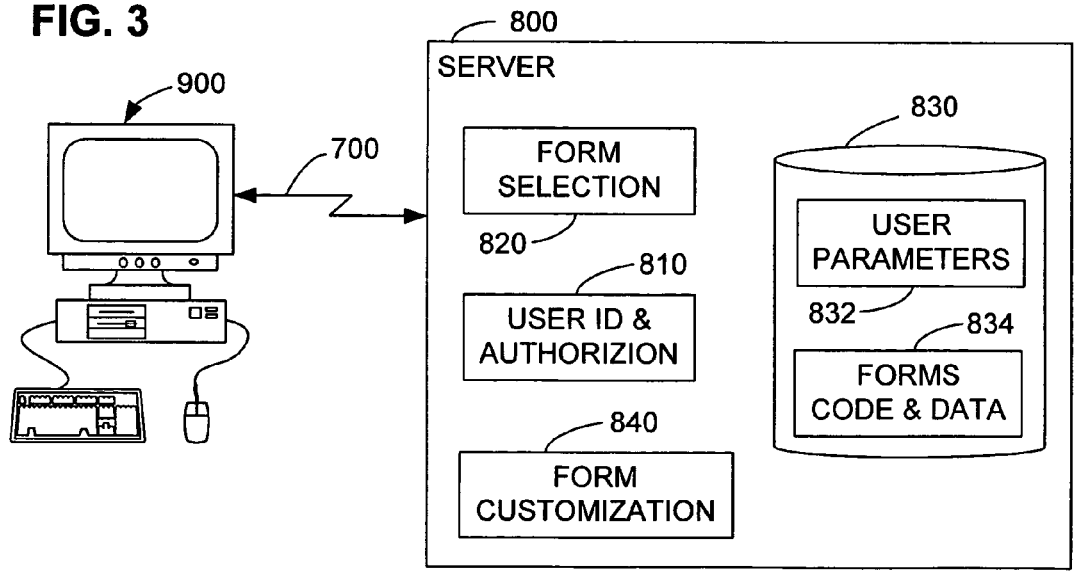

DATA INPUT METHOD AND SYSTEM WITH MULTI-SUB-FIELD MATCHING OF USER ENTRIES INTO A GRAPHICAL INPUT DEVICE

CROSS-REFERENCE TO RELATED APPLICATIONS

This application is a divisional (37 CFR 1.53) of and claims priority of pending U.S. patent application Ser. No. 10/080,472, filed Feb. 22, 2002 now U.S. Pat. No. 7,080,325.

BACKGROUND OF THE INVENTION

1. Field of the Invention

This invention relates in general to graphical input devices and in particular to input devices in which users select from a list of choices.

2. Description of the Related Art

Sending and receiving information via networks, especially the Internet, has become a daily event for a large number of people throughout the industrialized world. Airline tickets are ordered, books are bought, reports are submitted, subscriptions are entered, and thousands of other tasks are now routinely completed on-line.

Although the hardware devices—servers, routers, cables, etc.—that make the Internet possible are of course indispensable, they are transparent to most users. What is by definition very obvious to users, however, is the interface between them and the hardware structure. In the context of on-line information exchange, the most important components of this interface are the graphical user interface (GUI) of the user's computer in general, and the browser in particular.

FIG. 1 illustrates the well known, general components of a typical computer: System hardware 100 includes one or more processors (CPUs) 110 and one or more volatile and non-volatile memory devices 112. The system hardware will typically also include I/O cards and controllers 114 as needed to communicate with and control such input devices as a mouse (or trackball, joystick, etc.) 120 and keyboard (or speech recognizer, etc.) 122, as well as output devices such as a display monitor 124, which display screen 126 is viewed by the user.

System software 200 is usually installed to run on the hardware "layer" 100 and will include an operating system (OS) 220 and various drivers 222 that are used for software control of physical devices; note that the drivers 222 are typically installed in the OS itself. The GUI 224 is also often an integral component of the OS. One of the features of a GUI is that, together with supporting hardware components, it senses the position of an on-screen indicator such as a cursor 230 and relates this position to other displayed graphical devices such as icons, scroll bars, data entry fields, etc. When a user positions the cursor over a data entry field and causes some predefined activating event, such as "clicking" an appropriate button of the mouse 120, the GUI may, for example, associate text entered via the keyboard 122 with the variable or parameter width to which the selected data entry field is associated.

A user-level software layer 300, that is, applications, are usually installed to run on the system software. There are of course countless applications and it is these programs whose operation is most visible to users. In the context of the Internet, the application most relevant is known as a browser 310. At present, the most widely used browser is Microsoft Internet Explorer, of which there are several versions.

Defined broadly, a browser is an application that interprets and arranges elements (text, sound images, etc.) on a displayed web page so that a user can see and interact with network content. Defined a bit more specifically, a browser is software that interprets the programming language of the Internet into the text, graphics, sounds and effects (such as blinking, scrolling, etc.) that one sees when viewing a web page.

The programming language that all widely used browsers interpret is the Hypertext Markup Language (HTML), as well as its various derivatives such as DTML, XML, DHTML, etc. HTML is standardized by the World Wide Web Consortium (W3c) and is followed by most of the leading browsers. HTML is structured as a series of elements (commonly known as "tags"), each of which contains an instruction commanding the browser how to display, for example, images and words. Different versions of HTML support not only text, multimedia, and hyperlink features but also scripting languages. When a user, via the browser 310, contacts a web site (for example, using a URL) and requests download of content, what is transferred over the network 700 from the site-hosting server 800 is the HTML code and data, which the browser then interprets to generate the display that the user actually sees.

A "script" is a list of commands that are embedded in the HTML code defining a web page and can be executed by or within the browser. In essence, a script is a "program within a program" and can be used to affect the actions of the browser. The scripting language most commonly used in the Microsoft Internet Explorer, for example, is "Visual Basic Scripting Edition" or "VBScript" for short. VBScript is a simplified derivative of the Visual Basic programming language and enables web authors to control the action and visual characteristics of interactive controls. The time and nature of the execution of the script is controlled by the script designer and can be called from within a web document. The script is often activated and run as a result of mouse functions, buttons, or other user actions.

All of the hardware and software features and concepts described above are very common and well known. What is also common, but less noticed by users, is that conventional graphical, text-input devices generated by browsers have limited flexibility. In particular, because of the nature of existing HTML tags, the width of the displayed input field of a device such as a "pull-down menu" or "selection box" is determined by the widest possible entry, or a predefined width set by the programmer. This limitation is illustrated in FIG. 1, which shows a very simple example of a web page, with a logo 400 and data entry fields for a customer number, the date, and a state/province. This might for example be the input screen for a company that wants tracking information for all shipments of goods to a given state/province on a certain date for a given customer.

Where there are a large number of different customers, it would be impractical for the browser to display every possible customer number. Assume therefore for the sake of this example that the user has obtained the customer number before entering the illustrated input screen; for example, he may have looked up the number using a previously displayed web page. To enter the customer number the user positions the cursor 230 to point within a corresponding data entry field 410, clicks on a mouse button to select or "activate" this field, and, using the keyboard 122, enters the desired customer number. By pressing the "Enter" key on the keyboard, by double-clicking the mouse button, by clicking the mouse button outside the data field 410, and/or by taking any similar field predefined action, the user indicates that he has completed his entry for the customer number. The browser then associates the entry with the corresponding parameter, which is defined as part of the HTML code. This is the operation of a standard HTML <INPUT> element.

The user may enter the date similarly, for example, selecting the Date data field 420 and typing in a date. Alternatively, it is common to display a small calendar icon 422 next to a date input field. When the user clicks on this icon, some portion of a calendar is displayed and the user can select a desired date by "clicking" on its portion of the displayed calendar. Assuming a monthly calendar is displayed, then each day would be a data selection field of its own, although no input is permitted other than selecting it with, for example, a mouse click or keyboard indication such as "Enter." Once a date is selected or typed in, then it is similarly associated with the corresponding HTML parameter.

The example shown in FIG. 1 also includes input fields 420, 424 and buttons 422, 426 for the customer's country and state/province, respectively. Consider now the State/Province data entry field 430. In the illustrated case, the user is to select this entry using a class of display devices known as a drop-down select list. Here, when the browser detects that the user has selected the data field, or an associated activating button 432, the browser displays a drop-down list 434 of possible choices. This list is displayed just below the data entry field 430; although this is done to make the selection more intuitive; it is also a requirement of the HTML <SELECT> element.

Assume now that the possible country entries are the USA, Canada 13, Germany 16, Switzerland 26 or Sweden 21, which are further divided into their respective states, provinces/territories, Bundesländer, cantons and Iän. In other words, there are (as of 2002), 50+13+16+26+21=126 choices the user might make. The question then becomes: How many characters wide should the data field 430 be displayed? The answer in all conventional browsers is: At least as many characters wide as the number of characters in the largest possible entry. In this example, this would mean that the data entry field 430, as well as the drop-down list 434, would need to be at least 22 characters wide in order to accommodate the possibility that someone would need to enter the German state of Mecklenburg-Vorpommern or the Swiss canton of Appenzell Ausserrhoden. This would be so even though the widest entries for the USA, Canada or Sweden would be only 14, 21, and 15 characters wide, respectively, in order to accommodate North or South Carolina, Northwest Territories, and Västra Götaland.

This limitation has at least one significant drawback, the common solution to which creates different drawbacks of its own: As FIG. 1 illustrates, although the left edges of the data entry fields 410, 420, 424, and 430 are aligned, the right edges usually will not be, unless all of these fields are wastefully made 22 characters wide as well. Misalignment of displayed input fields is not always merely a cosmetic disadvantage, although this disadvantage may in fact be significant enough on web pages that need to appear professional and be easy to use: If the page designer wishes to include many more displayed elements on the displayed page, for example, there may not be enough space without reducing font sizes below a legible minimum. In short, the inflexibility of existing browser-based, multiple-choice graphical input devices such as pull-down menus reduces the layout freedom of the web page designer.

One common attempt to avoid the drawbacks of an overly wide input field is to require the user to select from a list of abbreviations. In many cases, there are no standardized, widely recognized abbreviations, in which case users must be forced to learn them or look them up. This is of course often inconvenient. Even where there are standardized abbreviations, however, this solution is not necessarily easy to use since it still presupposes that all users know them. Continuing with the example shown in FIG. 1 and described above, it would be possible to list only the standard two-letter abbreviations for the possible states, provinces, etc., and countries. Not all European users would know off hand, however, that Mississippi and Missouri are abbreviated MS and MO, although this is arguably more likely than that the average American user would know that Sweden and Spain are abbreviated SE and ES, respectively.

The example shown in FIG. 1 is a mild illustration of the problem. One actual web site run by a major U.S. airline for on-line reservations had a "State" field for the user's address. In addition to the expected 50 entries, for which a field width of 14 characters would suffice, there was also a choice "Armed Forces Americas (except Canada)". The corresponding data entry field was therefore 37 characters wide (in fact, more, presumably to leave open the possibility of even longer possible entries), although the number of users requiring the long, 37-character entry is almost certainly miniscule compared to the number of users from the more compactly named States Iowa, Ohio, and Utah.

Another known method of reducing the necessary width of a data input field is for the possible entries to be truncated. This solution presents problems similar to those associated with abbreviations, including the drawback that an essential part of the information to be displayed may not be displayed at all.

The limitations of existing pull-down menus arise from the definitions of the HTML (for example) code with which they are created. Typically, a drop-down list is created in HTML using a <SELECT> element, which is an element that defines a set of options associated with an HTML label. Although the browser typically generates the drop-down menu and its other associated display fields (such as the button and selection box) when the page loads, it keeps these display objects invisible until the appropriate time. For example, if a user has scrolled down so far on the display screen that the menu should not be visible, then the browser ensures that it is not. The menu, its associated selection box, and the (optional) button may be made invisible or visible independently.

Associated with each input field, including those associated with <SELECT> elements, are predefined "focus events," which are user actions that indicate to the browser that the user wishes to enter data into that field or make a selection via the list. Typical focus events include the user "clicking" on the displayed data entry field, tabbing into the field, and/or clicking on a button next to the field. When an event handler within the browser senses a focus event associated with a drop-down menu, the browser will turn on the visibility of the corresponding selection box and position it correctly, normally just under the data entry field that is to be "filled in."

The possible selections for a pull-down menu may be determined in different ways. Note that a selection box can be considered as an array, with each row containing one possible value. There are different ways in which to populate this array with possible values. In the simplest case, all selections are included directly in the definition of the <SELECT> element and are transferred to the browser along with other HTML code used to generate the current web page. Another possibility is that the browser, upon encountering the <SELECT> element, contacts the server sending the page and downloads the possible selections, which are then stored in the array. In either case, existing browsers set the width of the data entry field of the <SELECT> element to at least the width needed to fully display the widest selection in the array; this width may also be fixed by the programmer.

One illustration of this technique is found in web sites developed by the EXportFILE company of Reno, Nev. In the pages displayed using EXportFILE technology, a drop-down menu may be wider than the input field with which it is associated. This allows users to see all possible entries full-width while not requiring the displayed data entry field itself to be set at the maximum width. The main drawback of the EXportFILE solution, however, is that the maximum width of the drop-down selection list is predetermined in the definition of the corresponding <SELECT> element, and is the same for all users. In other words, the width of the drop-down selection list, as well as all possible selections, are set and are included in the HTML code first transferred into the browser, regardless of the user. If one user has a single, very wide possible entry in a selection list, then the selection list displayed for all users will be wide enough to accommodate the one user's one wide entry. Although the selection list will disappear from the display as soon as a selection is made or is otherwise inactivated, it would still be advantageous not to display selection list any wider than necessary in order to obscure as little of the rest of the display as possible.

The EXportFILE solution may be adequate in cases where all users are to be presented with the same choices in each selection box. This is not always so, however. One example of a situation in which the one-size-fits-all approach does not work well would be where a company's employees go to customer sites for different reasons but all submit trip reports via the Internet. The reasons that a technician might go to the site will probably be very different from the reasons that a sales representative would visit. A contract employee placed at the customer's site would have still different tasks to report back. If the on-screen reporting form includes an input field such as a task code, then the possible codes would be very different for the different reporters. Moreover, the list of possibilities may change with time. Ideally, the choices presented to users could be easily updated and would correspond to the type of services each performs; this is not possible where the HTML code controls the input.

It is also possible to condition the width of one selection list on an entry into a different input field. Returning to the example of FIG. 1, if a user enters "USA" as the country, the browser could automatically restrict the drop-down selection list to U.S. states, so that a selection list 14 characters wide would suffice. Using existing browser technology, this is, however, practical only where the possible selections are known in advance and can be included in the definition of the corresponding <SELECT> element.

There are usually two different ways to navigate through the list of choices in a drop-down menu. Especially where only a portion of the total number of choices is displayed in the drop-down field at any one time, the first is to use the mouse (or equivalent) and cursor to move a scroll bar 436 until the desired entry becomes visible, and then select it in the normal manner. Another method, which may be combined with the first, is by using so-called "key press events." As its name implies, these events are triggered by the user performing some action on the keyboard, which the browser then converts into an appropriate action for the menu. For example, if a user presses the "Up" or "Down" arrow key when the selection box is active, the browser will highlight the entry just above or below the previous selection, respectively, and may scroll the display as needed, for example, where there are more possible choices than can fit in the displayed selection box. Pressing the "Enter" key or double-clicking with a mouse, however, is usually interpreted as meaning that the user has selected the currently highlighted array element for entry into the data field; the browser then typically once again renders the selection box invisible.

Another common and convenient type of key press event is where the user presses one of the alphanumeric and/or symbolic keys of the keyboard, for example, in order to input the first character of the desired selection. The browser then automatically scrolls to the first selection beginning with that character. For example, if the user wishes to select "Maryland" from a drop-down list of states, then he can type "M." Assuming that the entries are ordered alphabetically, the browser will scroll the drop-down selection box to the entry for "Maine," which it will typically also highlight. "Maryland" will then be visible as the next entry and can be selected with the mouse as usual, or by pressing the "Down" key followed by the "Enter" key.

The problem with existing graphical input devices is that they do not make it convenient and intuitive to go to the "Maryland" selection directly using the alphanumeric or symbolic keys alone: In many browser-based environments, if the user were to type "M" and then "A", the browser would first scroll to and highlight "Maine," but then would immediately scroll back up to the top of the list and highlight "Alabama," leaving the user no better off than when he started.

In some other browser environments, selections are grouped according to first characters and users can cycle through each group by repeatedly entering this first character. Continuing with the example above, the first time the user enters "M," "Maine" is highlighted, since it's the first state in alphabetical order that begins with the letter "M." Repeatedly entering "M" causes the browser to highlight, in turn, Maryland, Massachusetts, Michigan, Minnesota, Mississippi, Missouri, and Montana, whereupon it returns to highlighting Maine. In order to select "Montana" using the keyboard alone, the user would therefore have to enter "MMMMMMMM"; "MMMMMMM" would not be enough "Ms" and "MMMMMMMMM" would be too many. In other words, the user would need more keystrokes (eight "Ms") to select Montana than if he had simply typed the entire name "Montana" (seven keystrokes). This is both inefficient and non-intuitive.

The problem of inefficient and non-intuitive selection of entries from a drop-down list is compounded where the entries are ordered as items, sub-items, sub-sub-items, and so on, that is, hierarchically. For example, assume that a list is to include the various job functions in a large corporation. An alphabetically ordered list would in most cases be impractical. Rather, it would in most cases be better to organize the job functions by division, group, department, task, etc. For example, the administrative assistant in the patent department might be classified as "Corporate:Legal:lntellectual_Property:Patent:Admin_Assistant." Obviously, using any of the prior art selection methods described above would be far too cumbersome.

What is needed is therefore a graphical input device similar to a selection list that eliminates the need to size displayed entry fields to the largest possible entry, while still allowing the user to see full-width, complete selections. The width of the selection list itself should be flexible and not require all users to view a list dimensioned to accommodate the widest possible entry of any user. Preferably, the input device would also allow for easier direct keyboard selection of listed items, even where the items are arranged hierarchically. This invention provides an input device that has either, or both of these advantageous features.

SUMMARY OF THE INVENTION

The invention provides a data input method and corresponding system implementation that enables a "multi-field" search of possible user choices as the user enters character-by-character information into the input field of a graphical input device, which is nominally defined by code downloaded from a server. The invention is advantageously implemented in a user's computer system that has a mark-up language-based browser that generates and displays on a display screen a graphical input device, which is associated with an input parameter. A current set of user-selectable choices is associated with the graphical input device, with each user-selectable choice having at least one pair of information fields separated by a delimiter and each information field comprising sequentially ordered characters.

User selection of the graphical input device is sensed, and then a client-side script is executed locally, that is within the user's computer. The script senses user entry of a character sequence comprising at least one character; sequentially and character-by-character searches at least an initial information field for each of the user-selectable choices according to each user-entered character; for each character sequence of at least one user-entered character that matches a corresponding character sequence in the initial information field of at least one user-selectable choice, highlights at least one of the matching choices for the user; and if no initial information field of the user-selectable choices has a character sequence matching the user-entered character sequence, highlights for the user at least one user-selectable choice in a different information field whose initial characters match the user-entered character sequence. A matching user-selectable choice can therefore be located in more than one information field based on character-by-character comparison with the same user-entered character sequence.

Upon sensing an acceptance action by the user, the script then sets the input parameter of the graphical input device to the currently highlighted user-selectable choice.

BRIEF DESCRIPTION OF THE DRAWINGS

FIGS. 2A-2C illustrate the general appearance and operation of a graphical input device according to the invention, in use with an example of a data input screen.

FIG. 3 illustrates certain data structures and mechanisms implemented within a server configured to operate according to the invention.

DETAILED DESCRIPTION

Figure 1:
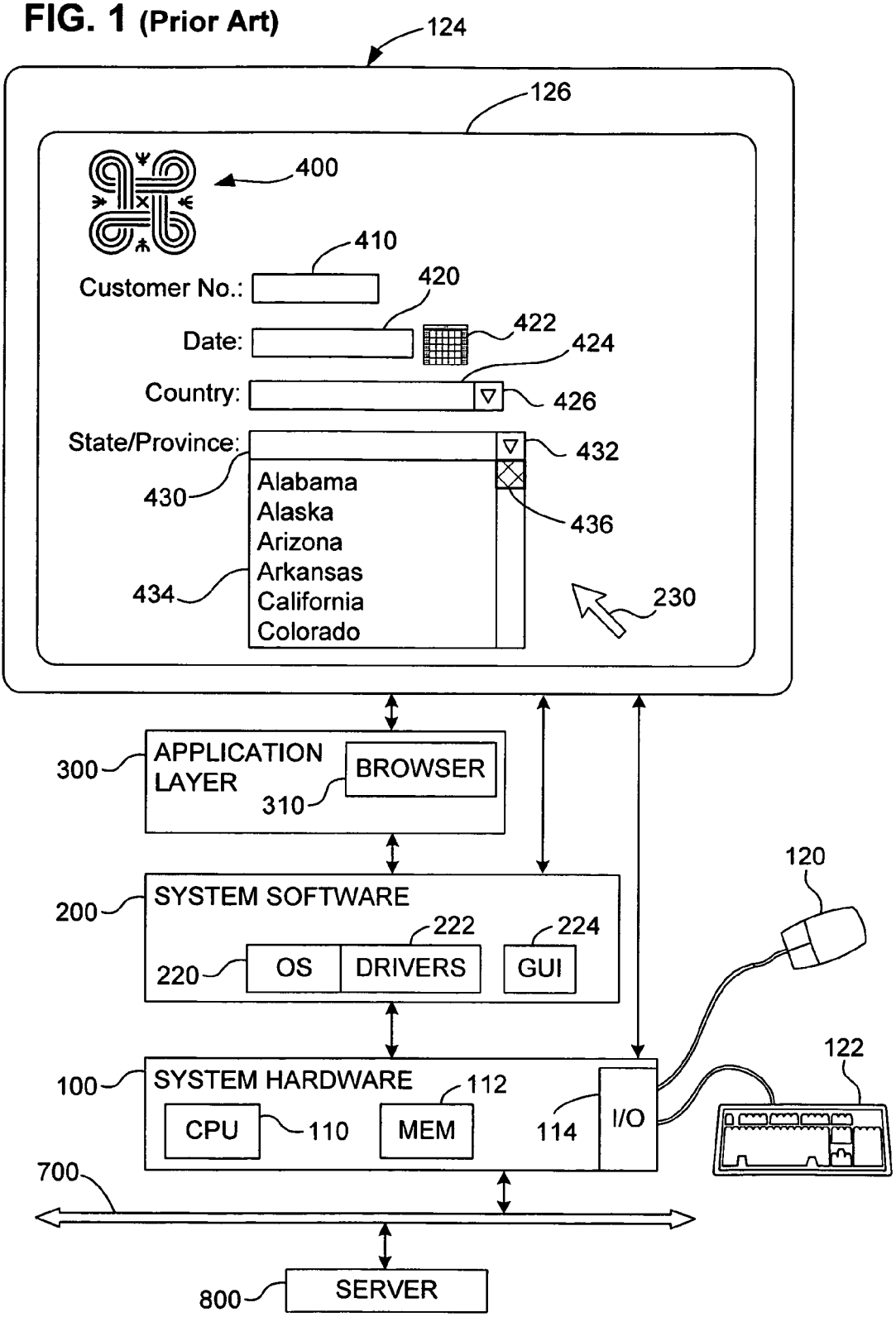
FIG. 1 illustrates the general configuration of a computer, the general operation of a browser, and a variety of conventional graphical input devices as found in the prior art.

The invention provides a new graphical input device for allowing a user to select from one or more entries for input into an on-screen data entry field. The primary anticipated use of this new graphical input device is in the context of data input via a browser, which is to be sent over a network such as the Internet. The techniques that enable this preferred browser-based input device are also applicable, however, to other contexts, such as in spreadsheets and similar applications, in which data is input into cells (which form data entry fields) and where the cell width would otherwise need to be at least as great as the widest possible selectable entry.

The graphical input device according to the invention resembles a drop-down menu with a selection box, but the preferred embodiment of the invention has either, and preferably both of two unique characteristics. First, the displayed width of the data entry field need not be the same as the width of the longest possible selection, but rather is sized automatically according to the selections available to the current user. Second, the graphical device according to the invention preferably allows the user to make multiple alphanumeric and/or symbolic keyboard entries to more quickly find entry choices based on more than just the initial character. These features are described further below.

FIGS. 2A-2C illustrate one hypothetical situation in which an employee submits browser-based reports over the Internet about work done at a customer site. FIG. 3 illustrates certain components and mechanisms included in the server 800 that enable it to communicate with a user system 900 so as to implement the features of the invention described below. The invention may be used, however, in any situation where a user is to enter data on-screen, and in particular where at least one data entry is to be made by selecting a choice from a selection menu. In the browser-generated display screen 126 of FIGS. 2A-2C, several input devices are displayed. The other features of a general computer as shown in FIG. 1 are assumed to be present in the invention. Because they are well known, however, and for the sake of simplicity and clarity, they are not reproduced in FIGS. 2A-2C or 3.

Assume first that the employee has identified herself to the server 800 in which the invention is implemented using a browser and any conventional log-on or standard input screen. An employee such as "Rose Beck" will thus log into the server 800 by giving either her name, employee ID number, and typically also a password, and she will usually also indicate which online data entry form (such as "Customer Visit Report") she needs. Using a conventional software module 810 for user ID and verification, the server can then identify and authenticate the user as "Rose Beck. A similar module 820 may be used to identify the desired form, for example, the illustrated "Customer Visit Report," based on the user's input. These are of course well known techniques and mechanisms, which enable the server to retrieve from a data base 830 the parameters 832 specific to the user, as well as code and data 834 defining the various available forms.

In FIG. 2A-2C, in addition to showing "Rose Beck" as the reporting employee in a field 500, a conventional date entry field 504 is shown (along with a calendar icon 505), as well as data input fields 506-508 and 511 for the customer's name, address, city, state/country and ZIP or postal code, respectively. Input fields 502, 509 and associated drop-down buttons 503, 510 are also shown for input of the type of service/task performed at the customer site and for the customer's state/country, respectively. Although the graphical devices 502, 503 (and possibly even 509, 510) appear to the user to be conventional devices in which a set of choices is displayed for the user as a drop-down selection list, they are assumed here to be implemented according to the invention. Of course, any number of graphical input devices according to the invention may be included on any given screen presentation.

Now consider an input field, such as 502, for which a drop-down selection list is to be generated, and for which the possible choices may vary according to the user. For each such field, the set of possible choices can be considered to be a user-specific parameter that can be stored, for example, in the data base region 832. According to the invention, a form-customization module 840 in the server retrieves the list of possible choices for the input field 520 that are to be presented to the current user, for example, from the data base region 834. The form-customization module 840 may use any known mechanism, for example, a look-up table, to decide which set of choices to retrieve for a given user and input field on the currently chosen form.

In the preferred embodiment, the form that the user has requested is defined for the browser in HTML or one of its derivatives (such as dynamic HTML). As is well known, the HTML element known as a <DIV> defines a generic container, that is, a data space, with which alphanumerical and/or symbolic characters as well as functional parameters may be associated. The <DIV> element may contain almost any HTML element, for example, SELECT lists, tables, etc., and even other <DIVs>. Each <DIV> includes an identification (ID) parameter that can be referenced by scripting in order to change its value, font, etc.

According to the invention, the form-customization module 840 retrieves the possible choices associated with the data input field 502 (for example) and requesting user, and then populates a "container" <DIV> with "inner" <DIV> elements, each of which forms a row corresponding to a choice (one row per choice being presented to the user). The container <DIV> element is then downloaded to the user's system 900, in particular, its browser, along with the rest of the HTML code and data that define the requested form.

The choices presented for a data input field such as "Service Type" shown in FIGS. 2A-2C may be individualized, or may be grouped into user categories, or both. For example, the Service Type choices downloaded to users who are identified (via their names, employee ID numbers, etc., depending on what information is used to identify and/or authenticate the user) as field technicians might be "Installation," "Scheduled Maintenance," "Warranty Service," "Non-Warranty Service," "Upgrading," and "Field Testing," with respective job codes CODE 01-06, whereas sales representatives might need choices such as "Existing Customer," "New Customer," "Trade Show Contact," and so on. One advantage of storing the choices in the server 800 and downloading them to the browser at the time the form is requested, along with the other HTML code, is that the choices can be easily and centrally updated as needed.

Assume now that the user selects the Service Type data entry field 502, for example, by positioning the cursor 230 in the field 502 and clicking once. In other words, assume the user performs any predefined focus event associated with the data entry field 502, such as tabbing into the field, clicking in it, or clicking on the button 503. According to the invention, a software "scripting" module, which may be implemented using known programming techniques, is included in the HTML code that defines the current page and that is sent from the server 800 on which the page is hosted. Where the browser is Microsoft Internet Explorer, the scripting will typically be VBScript.

When the browser receives the HTML code for the requested page, it also receives a list of valid options for each selection field, 502 and 509. The lists are received as delimited text strings, which are converted into arrays by the scripting module using known techniques. The scripting module then builds the corresponding selection lists, such as list 520 for field 502. It does this by creating inner <DIV> elements (one for each item in each array) within the container <DIV> associated with each field, 502 and 509. These inner <DIV> elements become the options list associated with the field. The list is kept hidden from the user until the field, 502 or 509, is activated by tabbing into it, clicking on it, clicking on the button 503, 510 associated with it.

When creating the selection list 520, the scripting also evaluates the width of each choice that is to be included and determines the minimum width needed to allow full-width display of all the choices. Upon sensing ("trapping") any focus event for the input field 502, the scripting makes visible the selection list 520, which displays the possible choices for the user, and positions it preferably as if it were a standard drop-down list below the input field 502. The displayed width of the selection list 520 is at least the minimum width needed to display all the choices full-width unless this width exceeds the page width, in which case a horizontal scroll bar is preferably added in order to keep the select box width within the page.

Note in particular two features of the selection list 520 according to the invention: First, the selection list 520 may be wider than the data entry field 502. Second, the width of the selection list 520 is not fixed and the same for all users, but rather will depend on, that is, be customized for, the choices to be included in the list 520 downloaded for the current user (or user type). This is illustrated in FIG. 2B, in which the selection box 520 is shown as including the choices:

a. CODE 01:Installation
b. CODE 02:Scheduled Maintenance
c. CODE 03:Warranty Service
d. CODE 04:Non-Warranty Service
e. CODE 05:Upgrading
f. CODE 06:Field Testing Note that, whereas "Upgrading" requires an entry field only 17 characters wide for full display, the longest choice would require a display field 29 characters wide (including spaces and punctuation marks). Using conventional technology, either the data entry field 502 itself would need to be displayed 29 characters wide, which would in most cases rule out not only alignment with fields above and below it, but also any data entry field at all to either side, or all users who wish to enter data via the same screen would be shown a selection list 29 characters wide.

According to the invention, however, the data entry field 502 may be kept at any desired width, whereas the selection list 520 is allowed to be as wide as necessary to accommodate all the entries. Of course, entries even in the selection list 520 may be abbreviated or truncated as desired; this will be up to discretion of the page designer and will not be a requirement imposed by HTML syntax.

Once the selection list 520 is visible, the user may select an entry in any conventional manner, for example, by positioning the cursor over it, whereupon the scripting module preferably, as in conventional pull-down menus, highlights this entry. In FIG. 2B, for example, the user has selected "CODE 04:Non-Warranty Service." If the list of choices is so long that all choices cannot conveniently be displayed all at once in the selection list of the chosen height, then other conventional graphical devices such as scroll bars may be included.

When the selection list 520 is displayed (made visible) by the scripting module, the selection list 520 may totally or partially cover other displayed elements such as graphics, text, or other data entry boxes. For example, in FIG. 2B, the selection list 520 covers the Date field 504, as well as most of the text to the left of entry fields for State/Country, and ZIP/Postal Code. This will not usually inconvenience or confuse the user, however, because he will have taken actions indicating that he is at present interested in the field 502. The scripting module in the HTML code of the page is preferably coded so that it interprets an event such as clicking outside the selection list 520 to indicate that the list should be closed. The user will then once again be able to view all the entry fields and other display elements.

Once the user chooses an entry from the selection list 520, and performs any event (such as double clicking, pressing the "Enter" key, etc.) indicating acceptance of the chosen entry, then the scripting module inserts the chosen entry into the data entry field 502, for example, by inserting at least a portion of the selection into the <INPUT> element defining the field. That only a portion may be inserted is because the selected entry may be too wide to fit in the displayed field. FIG. 2C illustrates how the choice "Code 04:Non-Warranty Service" might be displayed in the field 502, namely, it is truncated to "Code 04: Non-Warr" merely for the purpose of display.

Note that although the display may be truncated, the actual value internally associated with the parameter corresponding to the field will remain full-width. When the user later activates (through a focus event) the field 502, the scripting module according to the invention preferably also traps this, and then displays the entire, full-width entry, for example, by redisplaying the selection list 520 with the entry highlighted; alternatively, the entry could be made to scroll horizontally, for example, under the control of "Left" and "Right" arrow keys.

With the invention, what the user views appears to be a conventional pull-down menu, but at times with an "extra wide" selection list. According to the invention, however, instead of a standard HTML element defining a drop-down menu's entry field, what is actually generated is an <INPUT> element, with a custom-built selection list 520, possibly with a drop-down button (such as 503) next to it—as far as the browser's normal routines are concerned, the graphical device is not a drop-down menu. In sum, according to the invention, the scripting module, which is embedded in and acts as a subroutine executing within the transmitted HTML code, simulates a drop-down menu, but does so by using and controlling other types of graphical input devices. It is of course possible to mix conventional, fixed-width selection lists and flexibly dimensioned selection lists according to the invention in a single browser display.

The ability to display the full-width text of drop-down choices, and to custom-size selection lists "dynamically," that is, based on the choices to be presented to a current, requesting user, is of course advantageous, since it reduces the demands on users to learn or manipulate abbreviations and truncations. "Custom-building" selection lists also eliminates irrelevant choices from the current user's display.

FIGS. 2A-2C illustrate yet another advantage, namely, the increased freedom of layout made possible by the invention: Note that not only the left but also the right edges of the entry fields 500, 502 are aligned, even though the text they contain may vary greatly in width. Such alignment is not required, of course, as is illustrated by the "Date" field 504 being slightly narrower than those above it. The advantage of the invention is that it allows the page designer to make many more such decisions, rather than being forced to work with field widths set by default or automatically according to the limitations of HTML.

According to another aspect of the invention, the scripting module is programmed, using known VBScript (for example) techniques, to process multiple or chained key press events rather than merely single events. Consider once again the example given above of an application in which a user is to select a state or country from a drop-down menu. To reiterate, using normal HTML menus, a user who wishes to select "Maryland" and presses "M" followed immediately by pressing "A" would cause the selection list to scroll to and highlight "Maine," then immediately scroll back to and highlight "Alabama." Alternatively, entries in the selection list are grouped by first character alone, with repeated entry of the first character causing cycling within the group.

The scripting module according to the invention implements either, and preferably both, of two routines that make keyboard-based selection easier. Note that scripting is able to intercept, that is, trap, key press events and control existing HTML-generated devices such as selection boxes.

According to the routine, key press events relating to selection boxes such as the list 520 are reinterpreted by the scripting module such that searching based on each key press event is carried out from the currently chosen (for example, highlighted) entry. Thus, if the user types "M", the scripting module will scroll to and indicate "Maine." The highlighted entry will not change when the user types "A" because "Maine" still meets the criteria that its first letter is "M" and its second letter is "A." If the user then types "R," however, the scripting module will select "Maryland," which is the first (and only) entry in the example to begin with "M" "A" and "R". Other key press events may be defined to indicate movement to the top of the selection list for example "Ctrl-Home." This feature of the scripting module may also be programmed using known techniques given this description of the invention.

Because of the speed of a browser relative to user's keystrokes, it is not necessary, although it is an alternative, to maintain a pointer in the selection list and to perform subsequent searches down from the pointer. For example, it is not necessary for the scripting to keep a pointer on "Maine" just because the user has entered "MA". Rather, the scripting preferably stores an array of all key press events that corresponding to valid selections from the list, and then searches downward and with left alignment from a root member (here, for example, Alabama—the first state in alphabetical order) until it finds an initial character match for all characters entered. Thus, when the user first enters "M", "Maine will be selected because it is the first in order to begin with "M." When the user then types "A", the scripting searches downward from "Alabama" and finds "Maine," since it is also the first to begin with "MA." When the user types "MAS", however, the scripting searches downward from the top member (Alabama) and finds "Massachusetts," which is the first member to have left-aligned "MAS."

The second feature of the selection search according to the preferred embodiment of the invention is that the scripting routine, when searching a selection list, preferably searches characters left-aligned to the right of a right-most delimiter. For example, in FIG. 2B, members of the selection list 520 are prefaced by a code (CODE 01-06), which is separated by a colon (one possible delimiter) from the corresponding descriptive text. In order to select "Upgrading" from the list using keyboard entries alone, using conventional browser technology, the user would have to type "Code 05" before reaching "Upgrading," assuming this entry could be reached at all, which would not be possible using the standard single-character search techniques. According to the invention, the scripting first locates the right-most delimiter (":") and performs character searching left-aligned after it. Accordingly, the user could select "Upgrading" simply by activating the selection list (with any focus event) and typing "U".

There is no theoretical limit to the number of delimiters that might be included. One could imagine, for example, that the full internal definition of the "Upgrading" selection might be "Field Tech:Customer Site:Code 04:Upgrading". Selecting this member from the selection list 520 using keyboard entries alone would be impractical or impossible using conventional browser-based technology, but is made fast, easy, and convenient using this aspect of the invention.

Recall that the scripting included within the HTML definition of the form/page preferably evaluates the choices in each selection list (such as 520) in order to determine the minimum required display width. In order to reduce not only the needed width but also redundancy, and thereby improve ease of use, the scripting could also compare choices from the left and truncate from the display any text that occurs identically in all choices, to the left of a delimiter. For example, continuing with the example above, there might be many different codes and tasks all as sub-items of "Field Tech: Customer Site:" Assuming this text occurs in all the choices to be made available to the user, then it can be deleted from the display so that only the "CODE 04:Upgrading," and so on, would be shown if included at all, this feature should be included only where no ambiguity or confusion could arise from such truncation. Note that this truncation is not the same as that found in the prior art, which truncates even non-repeated text and frequently obscures parts of the choices that are essential for correct reading and interpretation.

It should now be clear that the invention provides several advantages over the prior art. Because the displayed width of data input fields is not dictated by the width of the input choices (with, however, full-width viewing of the choices in the selection list), input pages may be designed to be as graphically appealing and easy to use as existing client server software. The ability of the invention to perform intelligent matches that start with the lowest sub-items (to the right of the right-most delimiter) in selection lists arranged hierarchically not only reduces how much typing the user must do, but it also enables easy navigation of long lists.

Heretofore, it has been necessary to adjust the form layout for every customer or, to allow only partial viewing of data or, for the most frequent choice for "wide" choices, to have each data field reside on its own row. This leads to long pages that cannot be viewed all at once without scrolling up and down and that cannot conveniently and clearly be printed. In contrast, the invention enables "flexible" standardization, in that the same browser-based input form can accommodate the proprietary data of different users, yet still maintain an easy-to-read and compact display.

We claim:

1. A data input method comprising:
   executing a script that is a list of commands that are embedded in the Hypertext Markup Language code defining a web page and can be executed by or within the browser;
   generating and displaying on a web page a graphical data input field sensing user entry in the graphical data input field of a character sequence including at least one character;
   associating an ordered set of data containing at least two selection lists, each one of said at least two selection lists including at least two character strings;
   associating at least two character strings from said at least two selection lists wherein each character string of said at least two selection lists is separated by a delimiter from an adjacent character string of said at least two selection lists;
   searching sequentially and character-by-character each character string of one of said at least two selection lists according to each user-entered character for a character match;
   searching as needed sequentially and character-by-character each character string of each remaining list of said at least two selection lists according to each user entered character for a character match;
   matching each character sequence with each character string of said at least two selection lists;
   sensing an acceptance action by the user, reflecting the current user selected choice.

2. A data input method as in claim 1 identifying at least one matching choice for the user by highlighting the choice.

3. A data input method as in claim 1 providing if no character string of said at least two selection lists has a character sequence matching the user-entered character sequence, highlighting for the user at least one choice within at least one character string of said at least two selection lists whose earlier characters matched the user-entered character sequence, whereby a matching user selected choice can be found.

4. A data input method as in claim 1 providing if no character string of said at least two selection lists has a character sequence matching the user-entered character sequence, change the color of the graphical data input field display.

5. A data input method as in claim 1 providing if no character string of at least two selection lists has a character sequence matching the user-entered character sequence, remove all choices from graphical data input field display.

6. A data input method as in claim 1 defining the delimiter as a space.

7. A data input method as in claim 1 defining the mark-up language as selected from the group including Hypertext Markup Language derivatives.

8. A data input method comprising:
   executing a script that is a list of commands that are embedded in the Hypertext Markup Language code defining a web page and can be executed by or within the browser;
   generating and displaying on a web page a graphical data input field as a non-menu, text-input graphic device in place of the defined drop-down menu; however, the graphical input device has the general appearance of the drop-down menu and is associated with the input parameter;
   sensing user entry in the graphical data input field of a character sequence including at least one character;
   associating an ordered set of data containing at least two selection lists, each one of said at least two selection lists including at least two character strings;
   associating at least two character strings from said at least two selection lists wherein each character string of said at least two selection lists is separated by a delimiter from an adjacent character string of said at least two selection lists;
   searching sequentially and character-by-character each character string of one of said at least two selection lists according to each user-entered character for a character match;
   searching as needed sequentially and character-by-character each character string of each remaining list of said at least two selection lists according to each user entered character for a character match;
   matching each character sequence with each character string of said at least two selection lists;
   sensing an acceptance action by the user, reflecting the current user selected choice.

9. A data input method as in claim 8 identifying at least one matching choice for the user by highlighting the choice.

10. A data input method as in claim 8 providing if no character string of said at least two selection lists has a character sequence matching the user-entered character sequence, highlighting for the user at least one choice within at least one character string of said at least two selection lists whose earlier characters matched the user-entered character sequence, whereby a matching user selected choice can be found.

11. A data input method as in claim 8 providing if no character string of said at least two selection lists has a character sequence matching the user-entered character sequence, change the color of the graphical data input field display.

12. A data input method as in claim 8 providing if no-character string of at least two selection lists has a character sequence matching the user-entered character sequence, remove all choices from graphical data input field display.

13. A data input method as in claim 8 defining the delimiter as a space.

14. A data input method as in claim 8 defining the mark-up language as selected from the group including Hypertext Markup Language derivatives.

15. A data input method comprising:
   executing a client-side script module that is stored within the user's computer, that is a list of commands that are embedded in the Hypertext Markup Language code defining a web page and can be executed by or within the browser;
   generating and displaying on a web page a graphical data input field sensing user entry in the graphical data input field of a character sequence including at least one character;
   associating an ordered set of data containing at least two selection lists, each one of said at least two selection lists including at least two character strings;
   associating at least two character strings from said at least two selection lists wherein each character string of said at least two selection lists is separated by a delimiter from an adjacent character string of said at least two selection lists;
   searching sequentially and character-by-character each character string of one of said at least two selection lists according to each user-entered character for a character match;
   searching as needed sequentially and character-by-character each character string of each remaining list of said at least two selection lists according to each user entered character for a character match;
   matching each character sequence with each character string of said at least two selection lists;
   sensing an acceptance action by the user, reflecting the current user selected choice.

16. A data input method as in claim 15 identifying at least one matching choice for the user by highlighting the choice.

17. A data input method as in claim 15 providing if no character string of said at least two selection lists has a character sequence matching the user-entered character sequence, highlighting for the user at least one choice within at least one character string of said at least two selection lists whose earlier characters matched the user-entered character sequence, whereby a matching user selected choice can be found.

18. A data input method as in claim 15 providing if no character string of said at least two selection lists has a character sequence matching the user-entered character sequence, change the color of the graphical data input field display.

19. A data input method as in claim 15 providing if no-character string of at least two selection lists has a character sequence matching the user-entered character sequence, remove all choices from graphical data input field display.

20. A data input method as in claim 15 defining the delimiter as a space.

21. A data input method as in claim 15 defining the mark-up language as selected from the group including Hypertext Markup Language derivatives.

\* \* \* \* \*

UNITED STATES PATENT AND TRADEMARK OFFICE
CERTIFICATE OF CORRECTION

| | | |
|---|---|---|
| PATENT NO. | : 7,500,201 B2 | |
| APPLICATION NO. | : 11/445908 | |
| DATED | : March 3, 2009 | |
| INVENTOR(S) | : Varda Treibach-Heck, Byron G. Caldwell and Bruce Johnson | |

It is certified that error appears in the above-identified patent and that said Letters Patent is hereby corrected as shown below:

Claims 1, 8 and 15 should be amended as follows:

In column 13, line 40, claim 1 should be amended as follows:

1. A data input method on an Internet connected device comprising:
    a Graphical User Interface that has the appearance of a standard graphical data input field as a component of a web page;
    executing a specific script that is a list of commands that are embedded in the Hypertext Markup Language code defining a web page and can be executed by or within the browser using dynamic memory allocation to access an arbitrary element of at least two selection lists;
    sensing user entry in the graphical data input field of a character sequence including at least one character;
    associating an ordered set of data containing the at least two selection lists, each one of the at least two selection lists including at least two character strings, each one of the at least two character strings using one index;
    associating the at least two character strings from the at least two selection lists wherein each character string of the at least two selection lists is separated by a delimiter from an adjacent character string of the at least two selection lists and is accessed using more than one index;
    searching sequentially and character-by-character each character string of one of the at least two selection lists according to each user-entered character for a character match;
    searching as needed sequentially and character-by-character each character string of each remaining list of the at least two selection lists according to each user entered character for a character match;
    matching each character sequence with each character string of one of the at least two selection lists;
    sensing an acceptance action by the user, reflecting the current user selected choice.

Signed and Sealed this
Twenty-eighth Day of June, 2011

David J. Kappos
*Director of the United States Patent and Trademark Office*

CERTIFICATE OF CORRECTION (continued)
U.S. Pat. No. 7,500,201 B2

In column 14, line 24, claim 8 should be amended as follows:

8. A data input method on an Internet connected device comprising:
 a Graphical User Interface that has the appearance of a defined drop-down menu as a component of a web page:
 executing a specific script that is a list of commands that are embedded in the Hypertext Markup Language code defining a web page and can be executed by or within the browser using dynamic memory allocation to access an arbitrary element of at least two selection lists;
 sensing user entry in the graphical data input field of a character sequence including at least one character;
 associating an ordered set of data containing the at least two selection lists, each one of the at least two selection lists including at least two character strings, each one of the at least two character strings using one index;
 associating the at least two character strings from the at least two selection lists wherein each character string of the at least two selection lists is separated by a delimiter from an adjacent character string of the at least two selection lists and is accessed using more than one index;
 searching sequentially and character-by-character each character string of one of the at least two selection lists according to each user-entered character for a character match;
 searching as needed sequentially and character-by-character each character string of each remaining list of the at least two selection lists according to each user entered character for a character match;
 matching each character sequence with each character string of one of the at least two selection lists;
 sensing an acceptance action by the user, reflecting the current user selected choice.

In column 15, line 12, claim 15 should be amended as follows:

15. A data input method on a computer comprising:
 a Graphical User Interface that has the appearance of a standard graphical data input field as a component of a web page;
 executing a specific client-side script module that is stored within the user's computer, that is a list of commands that are embedded in the Hypertext Markup Language code defining a web page and can be executed by or within the browser using dynamic memory allocation to access an arbitrary element of at least two selection lists;
 sensing user entry in the graphical data input field of a character sequence including at least one character;
 associating an ordered set of data containing the at least two selection lists, each one of the at least two selection lists including at least two character strings, each one of the at least two character strings using one index;
 associating the at least two character strings from the at least two selection lists wherein each character string of the at least two selection lists is separated by a delimiter from an adjacent character string of the at least two selection lists and is accessed using more than one index;
 searching sequentially and character-by-character each character string of one of the at least two selection lists according to each user-entered character for a character match;

searching as needed sequentially and character-by-character each character string of each remaining list of the at least two selection lists according to each user entered character for a character match;

matching each character sequence with each character string of one of the at least two selection lists;

sensing an acceptance action by the user, reflecting the current user selected choice.